US 12,211,986 B2

(12) United States Patent
Stephenson et al.

(10) Patent No.: US 12,211,986 B2
(45) Date of Patent: Jan. 28, 2025

(54) METHOD AND CONTROL ARRANGEMENT FOR MONITORING COATING QUALITY OF SECONDARY CELLS

(71) Applicant: Northvolt AB, Stockholm (SE)

(72) Inventors: Sean Stephenson, Bureå (SE); Neil Carlisle, Skellefteå (SE)

(73) Assignee: NORTHVOLT AB, Stockholm (SE)

( * ) Notice: Subject to any disclaimer, the term of this patent is extended or adjusted under 35 U.S.C. 154(b) by 0 days.

(21) Appl. No.: 18/653,528

(22) Filed: May 2, 2024

(65) Prior Publication Data

US 2024/0372056 A1 Nov. 7, 2024

(30) Foreign Application Priority Data

May 5, 2023 (SE) .................................. 2350550-6

(51) Int. Cl.
*H01M 4/00* (2006.01)
*H01M 4/04* (2006.01)
*H01M 4/139* (2010.01)

(52) U.S. Cl.
CPC ....... *H01M 4/0404* (2013.01); *H01M 4/0435* (2013.01); *H01M 4/139* (2013.01)

(58) Field of Classification Search
CPC ...................................................... H01M 4/00
See application file for complete search history.

(56) References Cited

U.S. PATENT DOCUMENTS

| 5,618,640 | A | * | 4/1997 | Idota | ................ | H01M 10/0525 |
| | | | | | | 419/1 |
| 2013/0252119 | A1 | * | 9/2013 | Gottmann | ............... | H01M 8/00 |
| | | | | | | 429/535 |
| 2014/0271231 | A1 | | 9/2014 | Post | | |
| 2021/0350818 | A1 | | 11/2021 | Biswas | | |

(Continued)

FOREIGN PATENT DOCUMENTS

| CN | 111222762 A | 6/2020 |
| CN | 114070870 A | 2/2022 |
| EP | 2972636 A1 | 1/2016 |

(Continued)

OTHER PUBLICATIONS

KR-2012057437-A, English translation, (Year: 2012).*

(Continued)

*Primary Examiner* — Kelly M Gambetta
*Assistant Examiner* — Mohammad Mayy
(74) *Attorney, Agent, or Firm* — Alston & Bird LLP

(57) ABSTRACT

A method and control arrangement for monitoring coating quality during production of electrodes of secondary cells. The production of electrodes comprises a coating process including coating slurry onto a conductive substrate and drying the coated conductive substrate, and a calendering process. The method comprises measuring (S1), during the coating process and/or calendering process, power consumption of one or more electrical components used for performing the coating process and/or calendering process and evaluating (S3) the coating quality by analyzing the (Continued)

measured power consumption using coating quality criteria, wherein the coating quality criteria defines coating quality of the secondary cells based on measured power consumption of the one or more electrical components.

16 Claims, 6 Drawing Sheets

(56) References Cited

U.S. PATENT DOCUMENTS

2022/0158158 A1    5/2022  Kang

FOREIGN PATENT DOCUMENTS

| EP | 4156317 A1 | | 3/2023 |
|----|------------|---|--------|
| JP | 2014/037590 A | | 2/2014 |
| JP | 2019/102186 A | | 6/2019 |
| JP | 2019102187 A | | 6/2019 |
| KR | 2012057437 A | * | 6/2012 |
| WO | WO 2014/140212 A1 | | 9/2014 |
| WO | WO 2022/109570 A2 | | 5/2022 |

OTHER PUBLICATIONS

Swedish Office Action and Search Report for Swedish Application No. 2350550-6, dated Dec. 5, 2023, 11 pages, Swedish Patent and Registration Office, Stockholm, Sweden.
Acknowledgement Receipt, Response, and Amended Claims submitted on Mar. 27, 2024, for Swedish Application No. 2350550-6, filed in response to Office Action dated Dec. 12, 2023, Swedish Patent and Registration Office.

* cited by examiner

METHOD AND CONTROL ARRANGEMENT FOR MONITORING COATING QUALITY OF SECONDARY CELLS

CROSS REFERENCE TO RELATED APPLICATIONS

This application claims priority to and the benefit of Swedish Application No. 2350550-6, filed May 5, 2023; the contents of which as are hereby incorporated by reference in their entirety.

TECHNICAL FIELD

The present disclosure relates to ensuring high-quality production of rechargeable cells, commonly called secondary cells, for use in batteries arranged in electrical vehicles. More specifically, the disclosure relates to a method for monitoring coating quality of secondary cells and to a corresponding control arrangement.

BACKGROUND

In addressing climate change there is an increasing demand for rechargeable batteries, for example to enable electrification of transportation and to supplement renewable energy. Currently, lithium-ion batteries are becoming increasingly popular. Lithium-ion batteries represent a type of rechargeable battery in which lithium ions move from the negative electrode to the positive electrode during discharge, and back when charging.

A rechargeable battery, also referred to as a secondary battery, comprises one or more secondary cells, herein also referred to as simply "cells". For producing secondary cells, a slurry is prepared and coated onto a current collector foil in a coating process to form electrodes. In a following calendering process, the electrodes are compacted and thereafter cut or punched into strips of desired shape. Secondary cells are assembled from the electrodes and filled with electrolyte.

Customers require certain product quality characteristics with individual specifications of the lithium-ion cells, which are affected in different steps of the production process. During and after production, test procedures are performed in order to reveal such product quality characteristics regarding capacity, power density, energy density, storage life and life-cycle. These tests are commonly referred to as Performance and Lifecycle, P&L, tests, and may include both online and offline tests.

Production of secondary cells is undergoing ramp-up to meet a high demand for lithium-ion cells. It is desired to ensure high quality and cost-efficiency during ramp-up and mass production, and therefore to reduce downtime and waste.

SUMMARY

It is an objective of the present disclosure to provide a method to monitor quality of secondary cells during production. It is a further objective to provide such a method that is cost-efficient. It is a still further objective to provide a method to monitor coating quality of secondary cells during production that is performed in-line. It is also an objective to provide a method to improve quality of the secondary cells.

These objectives and others are at least partly achieved by the method, control arrangement and system according to the independent claims, and by the embodiments according to the dependent claims.

According to a first aspect, the disclosure relates to a method for monitoring coating quality during production of electrodes of secondary cells. The production of electrodes comprises a coating process including coating slurry onto a conductive substrate and drying the coated conductive substrate, and a calendering process. The method comprises measuring, during the coating process and/or calendering process, power consumption of one or more electrical components used for performing the coating process and/or calendering process. The method also comprises evaluating the coating quality by analyzing the measured power consumption using coating quality criteria, wherein the coating quality criteria defines coating quality of the secondary cells based on measured power consumption of the one or more electrical components.

The production or manufacturing of electrodes includes utilization of a plurality of electrical components. Especially the coating and calendaring processes make use of electrical components, which power consumption becomes indirect measures of the quality of the coating. The power consumption is evaluated against coating quality criteria, which typically defines a desired coating quality of the electrodes. The desired coating quality is for example defined by off-line inspection of previously produced cells using the same or similar electrical components. High quality examples of cells are selected, and the power consumption used during the coating and/or calendaring processes for these high-quality examples are used as reference. The method enables immediate detection of deviations from desired quality in-line, and thereby also immediate action to remove the cause of deviation. Real time interception of coating quality allows intervention in the coating process and reduced scrap of material. This is a considerable improvement compared to inspection off-line or at-line, where material and products may become wasted as the coating quality deviation was not detected in time.

According to some embodiments, the electrical components comprise one or more of: a foil feed motor, a slurry tank mixer motor, a slurry pump motor, a coating oven heater, a coating oven fan, a coating oven compressor, a slitting knife motor, a foil collector motor, a magnetic bar, a roller motor.

According to some embodiments, the coating quality criteria include an individual reference value for power consumption for each of the one or more electrical components, and one or more individual deviation limits from the respective individual reference value. Thereby, the coating quality can be evaluated on an individual electrical component granularity.

According to some embodiments, the individual reference value is based on power consumption for each of the one or more electrical components for verified desired coating quality of the secondary cells. Thereby, a real individual power consumption reference is provided that reflects a desired coating quality.

According to some embodiments, the coating quality criteria defines a power consumption signature of the coating process comprising individual reference values for a plurality of the one or more electrical components at the same time instance. Thereby, a robust monitoring of the coating quality can be achieved, as the coating quality is continuously evaluated at a plurality of locations along the electrode at the same time instance.

According to some embodiment, the coating quality criteria includes a reference value for power consumption based on aggregated power consumption for the one or more electrical components, and one or more individual deviation limits from the reference value. The coating quality can thereby be evaluated based on an aggregated power consumption for, for example, production of a whole roll. The reference value (and individual deviation limits) is then based on corresponding aggregated power consumption for the one or more electrical components during the same time period or interval, for example for making a roll.

According to some embodiments, the one or more individual deviation limits is one or more of a power consumption value, a mean value, a variance, and a standard deviation. Thus, the power consumption may be evaluated in a plurality of ways.

According to some embodiments, the evaluating the coating quality comprises analyzing the measured power consumption by comparing the measured power consumption of the one or more electrical components with the corresponding one or more individual deviation limits from the respective individual reference value for the same electrical component and determining a coating quality based on the evaluating. Thereby a coating quality can be determined in-line.

According to some embodiments, the evaluating comprises determining an action to be taken upon the measured power consumption failing to meet a predetermined coating quality of the secondary cells. Thereby an operator easily and fast can understand what is causing a compromised coating quality and can take immediate action to improve the coating quality.

According to some embodiments, wherein the action is one or more of stopping the coating process and/or calendering process, configuring at least one of the one or more electrical components, or testing the produced electrodes of the secondary cells. The cause of a compromised coating quality is for example a malfunctioning part, an incorrectly set or adjusted part or inferior quality of materials used. For example, an increase in power consumption could indicate a component is working harder caused by machine setting change or that the material is out of its specification. A decrease in power consumption could indicate a component failure.

According to some embodiments, the method comprises indicating a result of the evaluation to an operator, in particular via a display. Thereby the operator can continuously monitor the coating quality of the electrodes.

According to some embodiments, the method comprises obtaining monitoring data from one or more of the electrical components, wherein the monitoring data is other than data of power consumption, and wherein the evaluating additionally comprises evaluating the coating quality by analyzing the obtained monitoring data using coating quality criteria, wherein the coating quality criteria defines coating quality of the secondary cells based on obtained monitoring data of the one or more electrical components. Thereby the evaluation can be enhanced.

According to some embodiments, the monitoring data is indicative of one or more of weight, thickness, width and defects.

According to some embodiments, the method comprises developing coating quality criteria that corresponds to coating quality of the secondary cells. For example, the coating quality criteria includes reference values for power consumption of electrical components at a desired coating quality.

According to some embodiments, the developing coating quality criteria comprises developing a power consumption signature of the coating process comprising individual reference values for power consumption for a plurality of the one or more electrical components at the same time instance. Thereby a robust monitoring of the coating quality can be achieved, as when using such signature, the coating quality can be continuously evaluated at a plurality of locations along the electrode at the same time instance.

According to some embodiments, the method comprises updating the coating criteria based on one or more of the evaluating and data from tests of secondary cells. Thereby the coating quality can be continuously improved.

According to some embodiments, the method comprises updating the power consumption signature based on at least the analysing and data from tests of secondary cells. Thereby the coating quality can be continuously improved.

According to some embodiments, the measuring power consumption includes measuring power, current and/or voltage of one or more of the electrical components.

According to some embodiments, the coating quality criteria is time dependent.

According to a second aspect, the disclosure relates to a computer program comprising instructions which, when the computer program is executed by a computer, cause the computer to carry out the method according to the first aspect.

According to a third aspect, the disclosure relates to a computer-readable medium comprising instructions which, when executed by a computer, cause the computer to carry out the method according to the first aspect.

According to a fourth aspect, the disclosure relates to a control arrangement for monitoring coating quality during production of electrodes of secondary cells, wherein the production of electrodes comprises a coating process including coating slurry onto a conductive substrate and drying the coated conductive substrate, and a calendering process. The control arrangement is configured to obtain, during the coating process and/or calendaring process, power consumption of one or more electrical components used for performing the coating process and/or calendering process, and evaluate the coating quality by analyzing the measured power consumption using coating quality criteria, wherein the coating quality criteria defines coating quality of the secondary cells based on measured power consumption of the one or more electrical components.

According to a fifth aspect, the disclosure relates to a system for coating and/or calendering in production of electrodes of secondary cells. The system comprises one or more electrical components used for performing a coating process including coating slurry onto a conductive substrate and drying the coated conductive substrate and/or used for performing a calendering process on the coated conductive substrate, one or more power measurement units arranged for measuring power consumption of the one or more electrical components, and the control arrangement according to the fourth aspect.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings, in which.

DETAILED DESCRIPTION

Embodiments of the present disclosure will now be described more fully hereinafter, with reference to FIGS. 1 to 11. The same reference numbers are used throughout the figures. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art.

Figure 1:
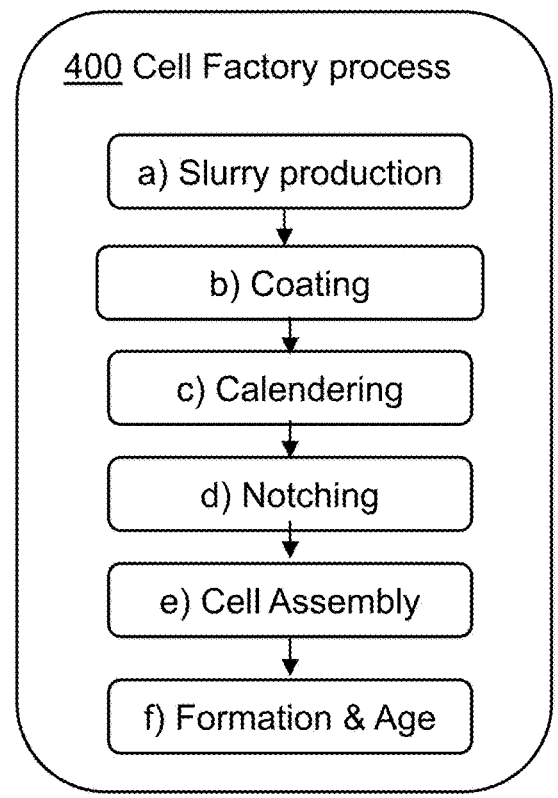
FIG. 1 illustrates an example cell manufacturing process performed in a cell factory.

For better understanding of the proposed technique, cell manufacturing will first be briefly described. Cell manufacturing is a complicated procedure involving many steps, and FIG. 1 illustrates some main steps of such cell manufacturing process 400. In step a), electrode slurry is produced. The slurry is a dispersion composed of conductive additives, polymer binders, and electrochemically active material particles that serve as reservoirs for lithium. The slurry is then coated onto conductive substrates, i.e., a metal foil, and dried to form a porous electrode foil, step b). In the calendering, step c), the electrode foil is compressed by passing through pairs of heated rollers, called calenders. Thereafter, notches or electrode tabs are formed along long sides of the electrode sheets, step d). The electrode tabs are used for forming and/or attaching the terminals of the cell. The cells are then assembled, step e). More specifically, the electrode foils are rolled with an isolating layer in-between and inserted into enclosures that are filled with electrolyte before they are sealed. The Formation and Aging, F&A, process step f), is the last step in the cell manufacturing process. In F&A the cells 1 go through a series of charging, discharging and aging cycles to activate the working materials and evaluate the cells performance.

Figure 2:
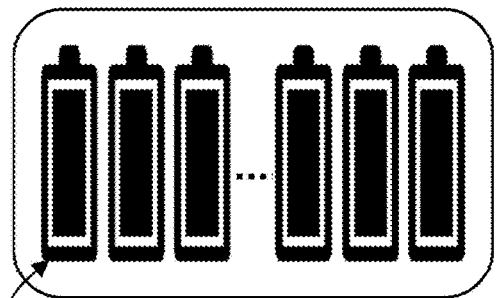
FIG. 2 illustrates an example battery pack comprising cells.

FIG. 2 illustrates a battery pack 402 comprising a plurality of secondary cells 404, hereinafter simply called cells 404.

Figure 3:
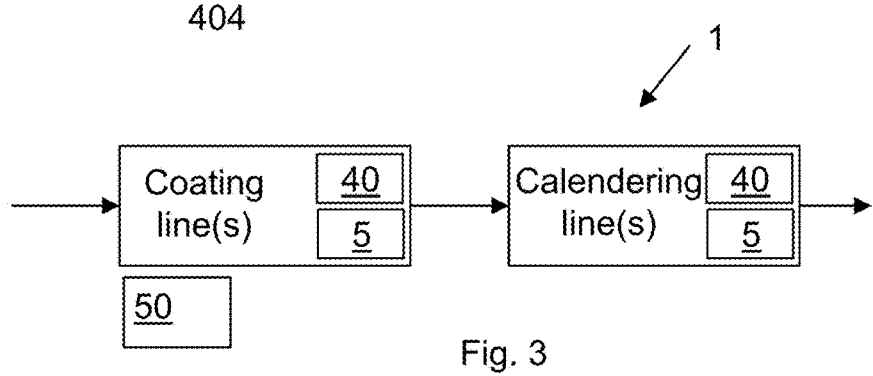
FIG. 3 illustrates a system according to some embodiments of the disclosure.

The present invention relates to one or more of the above-mentioned main steps. Particularly, the present invention relates to the coating step b) and/or the calendaring step c) and optionally any other of the main step. FIG. 3 illustrates a system 1 for performing the processing steps b) and c). In more detail, the present disclosure relates to a system 1 for coating and/or calendering in production of electrodes of secondary cells. The system 1 comprises one or more electrical components 5, in more detail a plurality of electrical components 5, used for performing the coating process in a coating line and/or the calendering process in a calendaring line. As already mentioned, the coating process includes coating slurry onto a conductive substrate and drying the coated conductive substrate. The calendaring process includes compressing the coating coated onto the conductive substrate. The conductive substrate may be referred to as a foil, e.g., a metal foil or current collector foil. The coated conductive substrate may be referred to as a coated foil or an electrode foil. These processes will be more described in the following. System 1 also comprises one or more power measurement units 40 arranged for measuring power consumption of the one or more electrical components. System 1 further comprises a control arrangement 50. The control arrangement 50 is configured to perform steps of a method that will be described in relation to FIG. 8. In FIG. 3, one power measurement unit 40 and one electrical component 5 is depicted for each of the coating line(s) and the calendaring line, but these are representatives for a plurality of power measurement units 40 and electrical components 5 in each line, as will be illustrated in the following, where examples of coating processes and the calendaring process will be described in more detail.

Figure 4:
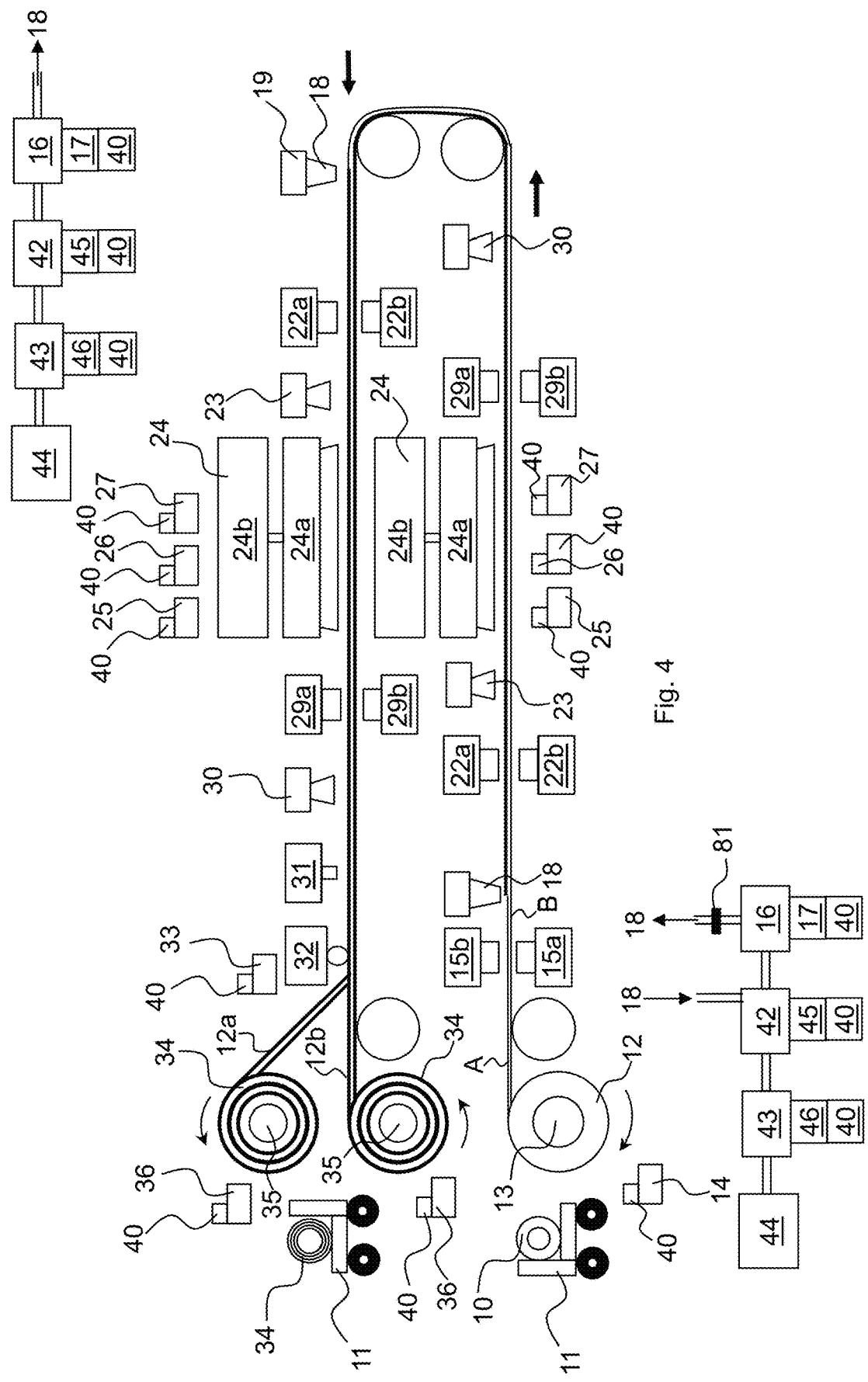
FIGS. 4-5 illustrate examples of a coating system for performing the coating process of step b) in FIG. 1 in further detail.

FIG. 4 illustrates one example of a coating system with coating lines for performing coating processes, where both sides of the foil are coated in separate lines, also referred to a tandem coating. FIG. 4 thus illustrates two coating lines, here referred to as an A-side coating line and a B-side coating line. The A-side coating line is illustrated as the lowermost coating line in FIG. 4, and the B-side coating line is illustrated as the uppermost coating line in FIG. 4. The A-side and B-side are the opposite sides of the foil that shall be coated. In the coating process in FIG. 4, first the A-side is coated and thereafter the B-side, without unloading the foil from the machinery. The coating process is operated as follows: First, a roll 10 of 500- to 800-meter-long current collector foil 12 is loaded onto a foil feeder 13 and unwound at an in-feeding station. The roll 10 is loaded from a carriage 11. A foil feed motor 14 actuates the roll such that the foil is unwound. Aluminum foil is used for the cathode side and copper foil for the anode side. The foil 12 is passed through weight measurement unit 15a, 15b, for example a Beta-Gauge configured to use beta transmission, to measure the bare weight of the foil 12. A Beta-Gauge is a fully automated inspection instrument, configured to measure a minimum of six data points per minute. Once the foil 12 is prepared for coating, slurry is transported, e.g., pumped, via slurry pipes 44 from a slurry storage tank (not shown) to an interface tank 43. The slurry is pumped from the interface tank 43 to a service tank 42 using an interface pump (not shown). The slurry is thereafter pumped from the service tank 42 to a coating head 18 using a slurry screw pump 16 actuated by a slurry pump motor 17. Slurry is now inside of a slot die of the coating head 18 and ready to be coated to the foil 12. The slurry that is not admitted to the slot die of the coating head 18 is recirculated to the service tank 42. A filter 81 is located in the slurry fluid path between the slurry screw pump 16 and the coating head 18. The slurry is continuously applied on the A-side of the foil through the slot die of the coating head 18. Different types of slurry are used for cathode and anode coating. The slurry is transported via pipes from the slurry tanks 42, 43 to the coating head 18. A magnetic mesh filter may be arranged between the first slurry tank 43 and the second slurry tank 42, to remove any loose metal particles. Another plastic mesh filter, i.e., the filter 81, may be arranged between the slurry screw pump 16 and the coating head 18. Each slurry tank 42, 43 includes a respective mixer, e.g., agitator or rotor, that is actuated by a respective mixer motor 45, 46 to homogenize the slurry. The coated foil 12 is then passed through a weight measurement unit 22a, 22b, for example a Beta-Gauge, that inspects the loading level of the wet coating and an image sensor 23, for example a camera, for visual inspection of the wet coated surface. Image sensor 23 is continuously scanning the entire surface of the foil 21, measuring the dimensions and identifying potential defects.

Next, coated foil 21 is passed through an electrical coating oven 24 to dry the applied slurry. The coating oven 24 may function as a Heating, Ventilation and Air Conditioning (HVAC) system. The coating oven 24 is schematically illustrated as comprising a dryer section 24a, a recovery/condenser section 24b, a coating oven heater 25, a coating oven fan 26, and a coating oven compressor 27. The coating oven 24 has two important mechanisms: solvent evaporation from the wet coated surface, and solvent diffusion through the dried coated surface. However, the drying step differs for the cathode and anode side. For the cathode side, the evaporated chemical solvent NMP (N-Methyl-2-Pyrrolidone) is recovered with the condenser section 24b. For the anode side, the evaporated water is removed, and the moisture-rich air goes through the condenser section 24b. The coating oven 24 may be divided into a plurality of modules 28, here 10 modules, schematically illustrated in FIG. 7. Each module 28 is part of the dryer section 24a, and the recovery/condenser section 24b. Each module 28 comprises a coating oven heater 25, and a coating oven compressor 27. A compressor motor provides power to a compressor head of the coating oven compressor 27. The coating oven 24 also comprises a coating oven fan 26. Fan 26 pumps air via a first circulation unit 61 and optionally one or more filters to a main heating oven intake located at a top side of the heating oven 24. Air is pumped out from the heating oven 24 via a plurality of second circulation units 62, optionally via one or more filters, back to the coating oven fan 26. A fan motor in fan 26 is actuating blades of the fan. An arrow illustrates the direction of the coated foil through the coating oven 24. When coated foil 12 has dried in the coating oven 24, the loading level of the dried coating is measured by a weight measurement unit 29a, 29b, for example a Beta-Gauge. The coated foil 12 is then passed by an image sensor 30, for example a camera, for visual inspection of the dried coated surface. The A-side coating is now ready.

The B-side of the foil 12 is then undergoing the same procedure as the A-side, as illustrated in the upper part of FIG. 3 in the B-line. Hence, slurry is provided on the B-side via a coating head 18, the coated foil 12 is then passed through magnetic bars 21a, 21b and a weight measurement unit 22a, 22b. The coated foil is then visually inspected by an image sensor 23 and passed through an electrical coating oven 24 to dry the applied slurry on the B-side. The dried coated foil is weighed by a weight measurement unit 29a, 29b and visually inspected by an image sensor 30 on the B-side. When the B-side of coated foil 12 has been treated, a printer 31 marks the coated foil with a QR-code to enable traceability. Then, the coated foil is cut into two foils 12a, 12b by a slitting knife 32 that is actuated by a slitting knife motor 33 in a half-slitting step. Finally, the two coated foils 12a, 12b are rewound to electrode rolls 34 on foil collectors 35 actuated by foil collector motors 36, and unloaded, then undergoing a final off-line inspection before the next process step. The next step is calendaring, which is illustrated in FIG. 6.

Figure 5:
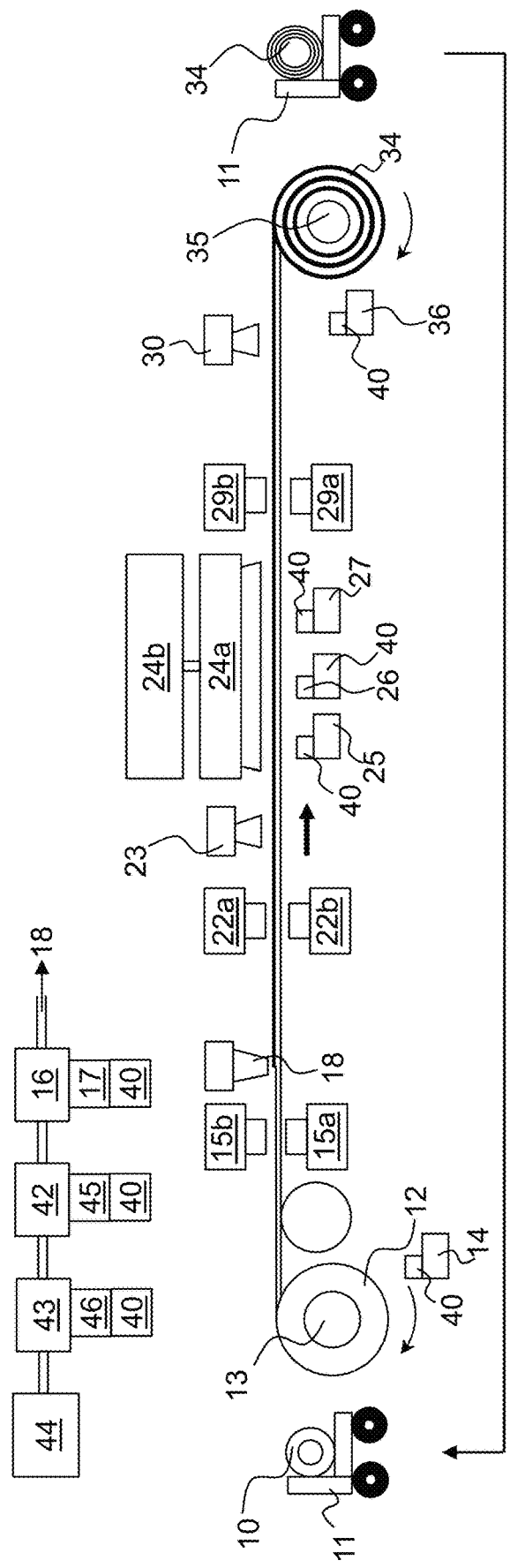

FIG. 5 illustrates another example of a coating system with a coating line for performing coating processes, where the foil 12 passes through the same coating line twice to coat both sides, referred to as single-line coating. Hence, first the A-side is coated, dried and rewound, whereafter the rewound foil roll 34 is unloaded and transported back to the in-feed station where it is uploaded and unwound to coat the B-side of the foil 12. The process for coating the sides is the same as illustrated and described in relation to the A-side coating line in FIG. 4 and will for brevity not be repeated here. When both sides have been coated, the final electrode roll undergoes a final off-line inspection before the next process step, which is calendaring, illustrated in FIG. 6.

During the coating process, different parameters can be adjusted, for example foil speed and tension, dryer temperature and slurry pressure at the coating head.

Figure 6:
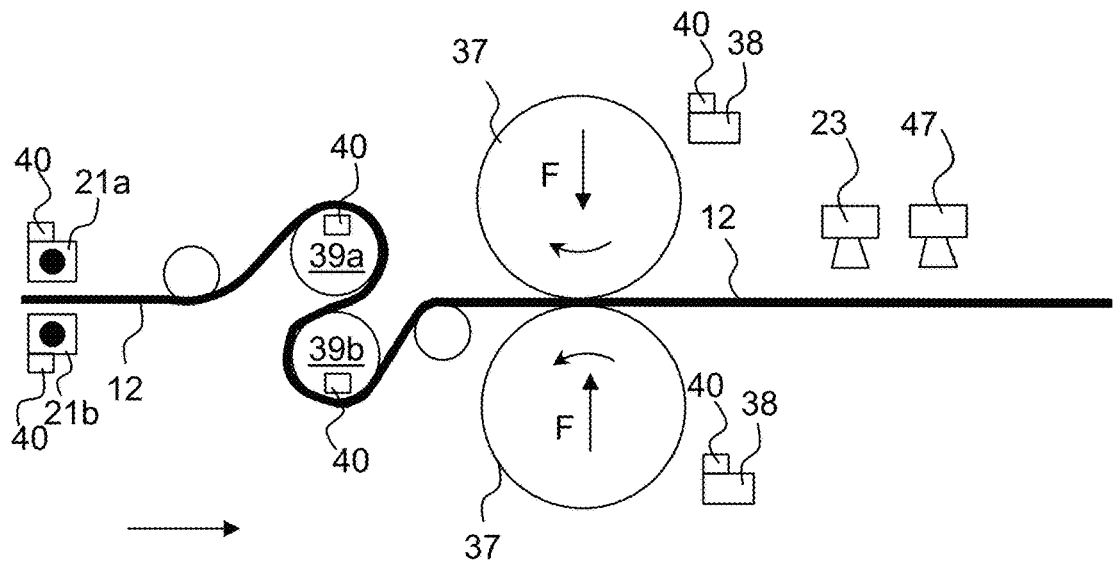
FIG. 6 illustrates an example of a calendaring system for performing the calendaring process of step c) in FIG. 1 in further detail.
Figure 7:
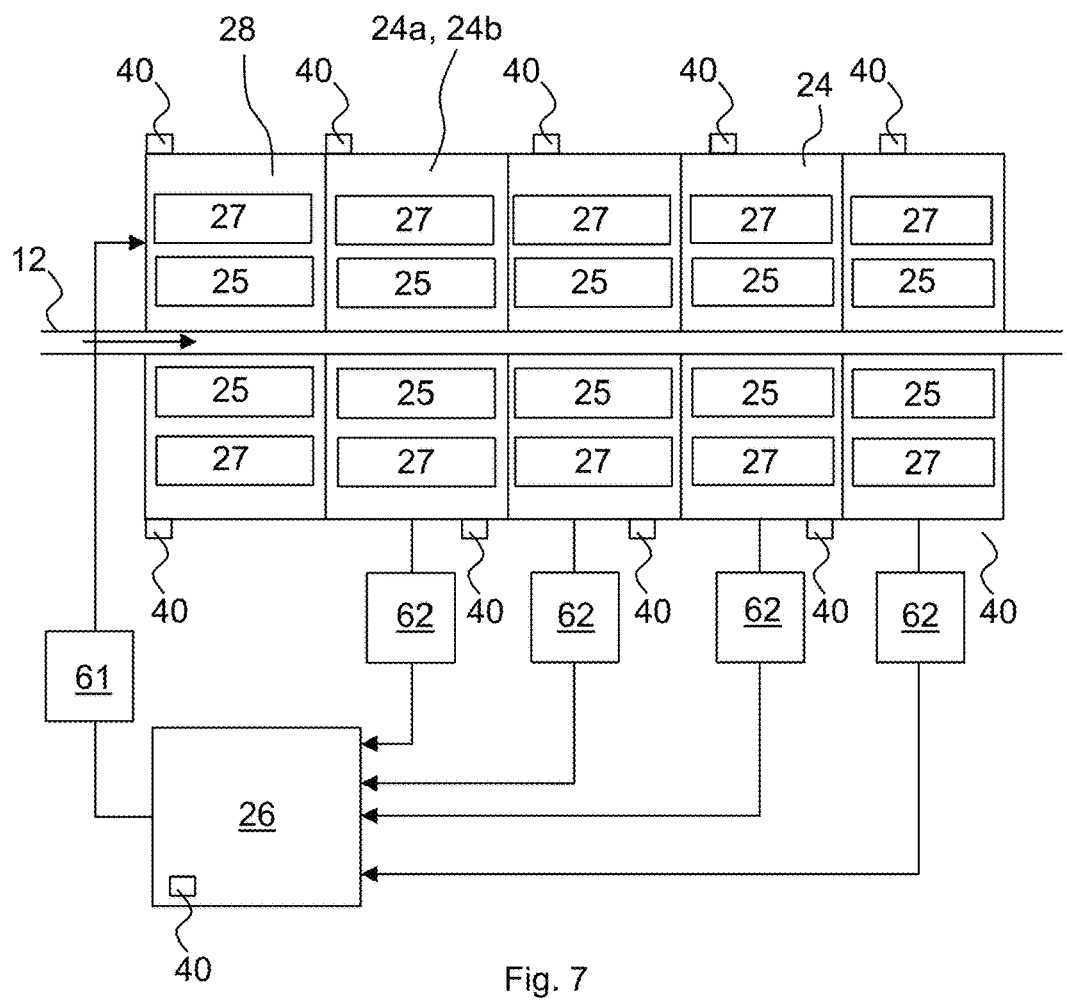
FIG. 7 is a schematic drawing of a coating oven.

FIG. 6 illustrates parts of a calendering system for performing steps of a calendering process of secondary electrodes. Calendering is a common compaction process for lithium-ion battery electrodes. The compaction process is decisive for the coating porosity, and thereby the energy content per volume, i.e., the energy density, of the electrodes. The calendering is typically different depending on if the coated foil is an anode or cathode. Generally, in any case, in the calendaring process the electrode foil, i.e., the coated foil 12, is pulled into a gap between two pressing rollers 37 working in opposite direction. Each pressing roller 37 is actuated by a roller motor 38. The roller motor 38 is effective in rotating the roller 37, but may also provide a rolling force F in the direction of the coated foil 12. For process control, either the gap size is set significantly smaller than the coated foil thickness or the rolling force (F) is adjusted to ensure a desired compaction of the coated foil. After the gap, the coating undergoes an elastic relaxation. Upstream the pressing rollers 37, the coated foil 12 may be heated on both sides with two pre-heating calendaring rollers 39a, 39b, for example induction heaters, in case of cathode pressing. Magnetic bars 21a, 21b are arranged to remove any loose metal particles from the coated foil 12 before being pressed between the pressing rollers 37. When the magnetic bars 21a, 21b are being powered, they attract loose metal particles. The magnetic bars 21a, 21b may have a variable magnetic strength based on feeded power. In some embodiments, also the pressing rollers 37 are heated by a heater (not shown) then referred to as heated pressing rollers 37, for example in case of cathode pressing. In case of anode pressing, the coated foil is not heated by pre-heated calendering rollers 39a, 39b and the pressing rollers 37 are not heated. During the calendering process, different parameters can be adjusted, for example foil speed and tension, gap size, rolling force (F), and temperature of pre-heating rollers and/or pressing rollers. After the coated foil 12 is pulled between the pressing rollers 37, the width and/or thickness of the coated foil 12 may be measured. The coating width is measured by an image sensor 23, for example a camera. The thickness of the coated foil 12 is measured using a thickness gauge 47, for example a laser thickness gauge. These measures may be performed in-line. Offline tests may also be performed to measure thickness and weight of the coated foil 12 before and/or after the rolling with the pressing rollers 37.

It should be understood that FIG. 6 only illustrates some steps of the calendering, and that the calendering process may include one or more steps of the following list of non-exhaustive steps: unwinding, edge trimming, dust collection, magnetic material removal, foil treatment roll cleaning, cooling, rewinding.

As understood, the coating process may include a plurality of electrical components 5 used in the coating process, namely: one or more foil feed motors 14, one or more mixer motors 45, 46, one or more slurry pump motors 17, one or more coating oven heaters 25, one or more coating oven fans 26, one or more coating oven compressors 27, one or more foil collector motors 36, and one or more slitting knife motors 33. The calendaring process may include a plurality of electrical components 5 used in the calendaring process, namely: one or more magnetic bars 21a, 21b, one or more roller motors 38, and one or more pre-heating calendaring rollers 39a, 39b. Each of these electrical components 5 is connected to a power network and consumes power when being operated. The power consumed by each electrical component 5 is measured with a respective power sensor 40. The power consumed by any of these electrical components is also an indirect measure of the quality of the coating. For example, if a foil collector motor 36 consumes more power than usual, it may be an indication that the load on the foil collector motor 36 is greater than usual, e.g., that the coating layer is too thick and therefore is heavier to pull. If the foil collector motor 36 consumes less power than usual, it may be an indication that the load is smaller, e.g., that the coating layer is too thin. A motor may alternatively be referred to as an engine. A motor herein is typically an electrical motor.

In the following, a method for monitoring coating quality during production of electrodes of secondary cells will be described. The method may be implemented as a computer program comprising instructions which, when the computer program is executed by a computer or control arrangement 50, cause the computer or control arrangement 50 to carry out the method according to any of the embodiments as described herein. The disclosure also relates to a computer-readable medium comprising instructions which, when executed by a computer or control arrangement 50, cause the computer or control arrangement 50 to carry out the method according to any of the embodiments as described herein. The method is typically performed continuously during the coating and/or calendaring processes. The method is typically performed at least partly as an in-line method, where in-line is defined as a method that is performed directly in the process and monitors the coating quality of all products passing through the process, thereby enabling continuous coating quality monitoring and control.

Figure 8:
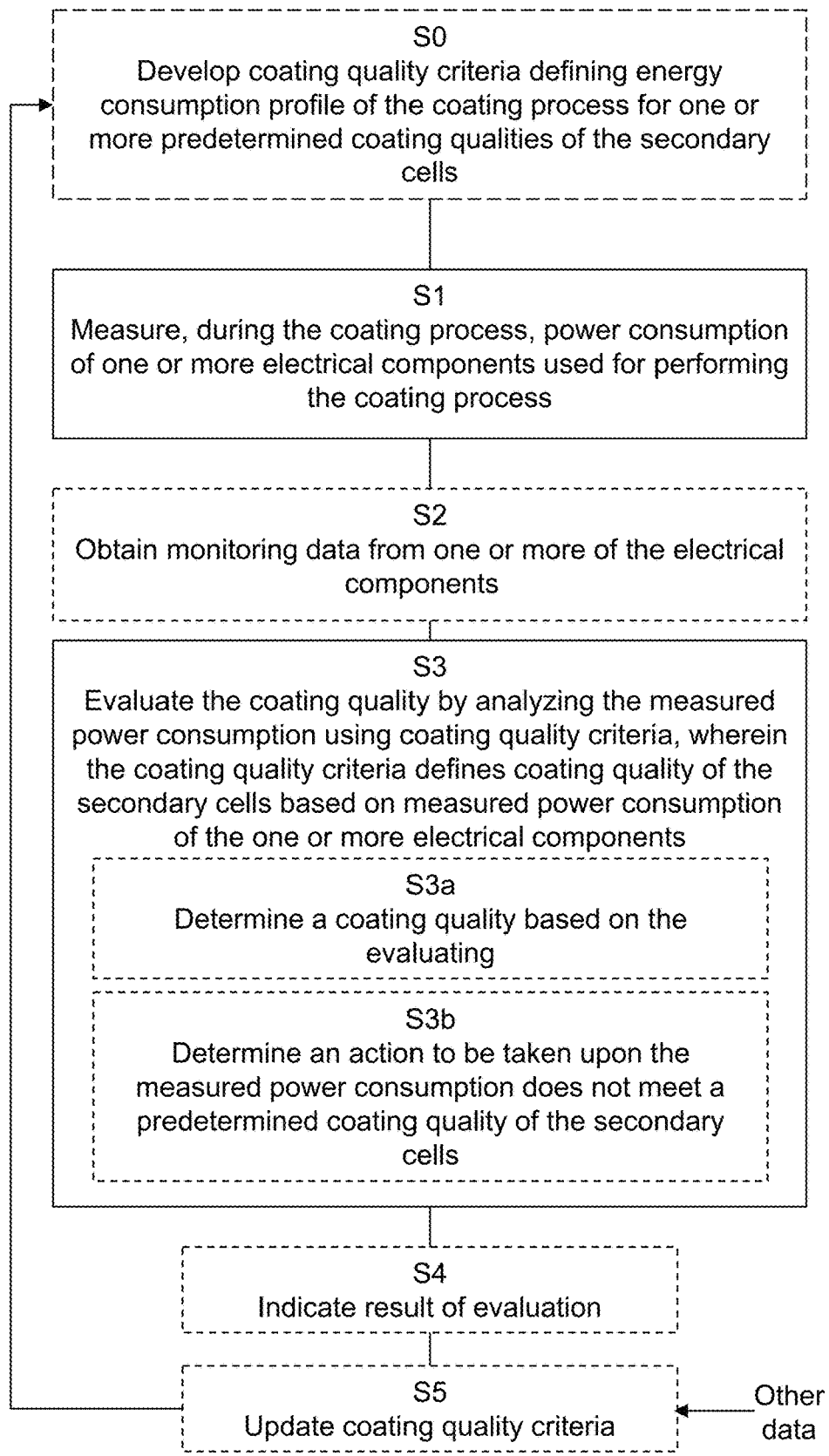
FIG. 8 is a flow chart of the proposed method for analysing coating.

The method will now be described with reference to the flowchart in FIG. 8, and to FIGS. 4 to 6. The method comprises measuring S1, during the coating process and/or calendering process, power consumption of one or more electrical components 5 used for performing the coating process and/or calendering process. The coating process may also include steps in preparing a slurry to be used in the coating process. This measuring step is performed using the power sensors 40 as illustrated in any of FIGS. 4 to 6, or by measuring voltage and/or current consumed by the one or more electrical components by any other means represented in the figures by power sensors 40. In other words, measuring power consumption includes measuring power, current and/or voltage of one or more of the electrical components. The method further comprises evaluating S3 the coating quality by analyzing the measured power consumption using coating quality criteria. The coating quality criteria defines coating quality of the secondary cells based on measured power consumption of the one or more electrical components. Thereby the coating quality can be continuously evaluated in-line without needing to stop the manufacturing. Based on the analysis, an operator may improve the coating quality during the same coating process, for example by configuring electrical components 5 in use. The coating quality may also be evaluated based on aggregated power consumption, for example the power consumption for a certain time period or production sequence such as producing one roll, to evaluate the quality of the coating of the produced roll. Based on the analysis, an operator may improve the coating quality in a coating process for a subsequent roll by configuring electronic components 5 to be used in that process.

The coating quality criteria may be developed off-line by inspecting and testing secondary cells produced using electrodes from the same or similar production lines. Hence, the method may comprise, before the measuring S1 step, developing S0 coating quality criteria that corresponds to coating quality of the secondary cells. The cell or cells with high or highest quality are typically used as reference, hereafter referred to as reference cells. The power consumed by the electrical components during coating and/or calendaring of the reference cell(s) e.g., for a shift, batch or roll production, is used as reference power consumption for achieving the same high quality of the coating as the reference cell(s). The reference power consumption may, for example, include momentary or instantaneous power consumption for one or more electrical component(s), and/or aggregated power consumption for one or more electrical components during a time period. Aggregated power consumption may also be referred to as accumulated power consumption. The time period may, for example, be defined as a time period for and while producing a roll. A reference power consumption for a plurality of electrical components may for example include an aggregated power consumption for the electrical components included for making a roll. In other words, in some embodiments, the coating quality criteria includes a reference value for power consumption based on aggregated power consumption of the one or more electrical components, and one or more individual deviation limits from the reference value. Hence, the reference power consumption is based on verified desired coating quality of the secondary cells. In more detail, if power consumption is equal, or within some limits, of the reference power consumption, the coating of the cells is assumed to be of high quality. If power consumption is not equal, or not within some limits, of the reference power consumption, an operator may be notified in order to, e.g., improve the coating quality. Typically, the power consumption for an electronic component 5 shall be more or less constant during operation, if the electronic component 5 is functioning as intended and the coating quality is according to the quality of the coating of the reference cell(s). However, in some cases the reference power consumption for a reference coating quality varies over time according to a certain pattern. The coating quality criteria is then time dependent.

The reference value for power consumption may be dynamic. To be dynamic here means to be dependent on properties such as temperature, viscosity of slurry, solid content of slurry, etc. A dynamic reference value for power consumption may then vary based on one or more such properties. Such dependencies or relationships are typically determined in beforehand by experiments or known by other means. For example, a relationship between viscosity (optionally plus solid content) of the slurry used, and power consumption, can be determined and used for providing a respective reference value for the power consumption of the slurry tank mixer motors 45, 46, and the slurry pump motor 17.

In some embodiments, the power consumed is an average or mean value of a plurality of power consumption values during a certain time period. Hence, the method then comprises calculating such average or mean value continuously, for example using a sliding window method where the average or mean value is calculated over the power consumed in the window. In some embodiments, the reference value is an average or mean value of a plurality of power consumption values during a certain time period, for example for making a roll.

The electric components might have certain power characteristics. For example, a motor may have a spike in power consumption when it starts, and a drop in power consumption when the motor starts running on the secondary winding. In some embodiments, the method comprises evaluating S3 the coating quality also based on such power characteristics. Hence, the coating quality criteria may include a plurality of individual reference values for power consumption for each of the one or more electrical components, and one or more individual deviation limits from the respective individual reference value of the plurality of individual reference values. Hence, the coating quality criteria may include a reference value or reference values for power consumption during start up, a reference value or reference values for power consumption start running on secondary winding, and so on. Hence, also deviations in power consumption during such sequences may be monitored. The evaluating S3 may include aggregating or sum the measured power consumption of a plurality of individual electrical components 5 during the same time instance or interval and analysing the aggregated measured power using coating quality criteria. The coating quality criteria defines coating quality of the secondary cells based on correspondingly aggregated measured power consumption of the one or more electrical components. Hence, power consumption of a plurality of electrical components can be evaluated together.

Some electrical components 5 are being operated together and their power consumptions may be aggregated and evaluated using corresponding aggregated power consumption references. For example, the electrical coating oven 24 comprises a plurality of modules, and the power consumption from the coating oven heater 25, coating oven fan 26 and coating oven compressor 27 are aggregated with corresponding values from the other modules.

The power consumed may be allowed to vary to a certain extent from the reference power consumption. Hence, in some embodiments, the coating quality criteria includes an individual reference value for power consumption for each of the one or more electrical components 5, and one or more individual deviation limits from the respective individual reference value. Specifically, the individual reference value may be based on power consumption for each of the one or more electrical components for verified desired coating quality of the secondary cells. Hence, an evaluation may include comparing the power consumption for each of the one or more electrical components 5 with the respective individual reference value for power consumption of the electrical component, and respective optional one and more individual deviation limits, and if the power consumption for each of the one or more electrical components is within limits, the coating is considered satisfying. A verified desired coating quality is for example defined as individual reference value for power consumption for each of the one or more electrical components.

Individual reference values for power consumption for a plurality of electronic components may together form a power consumption signature for a reference cell. The power consumption signature then becomes a snapshot of a desired power consumption for a plurality of electrical components at one and the same time instance. In other words, in some embodiments the coating quality criteria defines a power consumption signature of the coating process comprising individual reference values for a plurality of the one or more electrical components at the same time instance. In some embodiments the power consumption profile includes individual reference values of power consumption for all of the electrical components 5 used in the coating and/or calendaring, except electrical components used for inspecting.

The evaluating S3 may include comparing the power consumed by an electronic component during production to the respective individual reference value and one or more deviation limits of the reference value. If the power consumed deviates more than one or more deviation limits, an action to be taken may be suggested to an operator. In other words, in some embodiments evaluating S3 the coating quality comprises analyzing the measured power consumption by comparing the measured power consumption of the one or more electrical components with the corresponding one or more individual deviation limits from the respective individual reference value for the same electrical component. Generally, if there is a power consumption deviation, there might also be a deviation in the quality of the coating. For example, in terms of thickness, width, dryness, weight or similar. The deviation may for example be a sign of over-work by a machine and can lead to failure of a component. The deviation may come from mechanical errors, software errors, or human errors stemming, e.g., from incorrect input, configuration or setting by an operator. Hence, the method may enable health monitoring of the electrical components used. The deviation may alternatively or in combination come from errors in the materials used, for example property errors in the used slurry and/or foil. Hence, the method may enable property monitoring of the materials used.

The one or more individual deviation limits may be one or more of a power consumption value, a mean value, a variance, and a standard deviation. Hence, in some embodiments the evaluating comprises calculating a means value, variance or standard deviation using a plurality of power consumption values during a time period. The evaluation may then be performed with an improved accuracy.

In some embodiments, the coating quality criteria comprises using Nelson rules. The Nelson rules are a set of rules based on mean value and standard deviations of the measured variable, here the power consumption, to determine if the measured variable (power consumption) is out of control. The mean value and standard deviations are calculated based on the power consumption used during production of the reference cell(s). The Nelson rules can typically find a trend that is outside a normal variation indicating a special cause variation in the equipment or coating slurry, which could lead to an inferior coating quality. If the trend is outside normal variation, an alert should be raised to an operator. In other words, the Nelson rules can be used to show if the power consumption, hence the process result, is trending or clustering in real time. For example, if the power consumption is measured every 5th or 10th seconds and six measurements in a row are trending upwards, an alert should be raised by the control arrangement 10 to notify an operator. One example of such special cause variation could be clogging of a filter in the pipes transporting slurry (e.g., filter 81), because of, for example, large particles. The pump (interface pump or slurry screw pump 16) pumping the slurry might then have to work harder, causing a trend upwards in the power consumption as the filter gets more and more clogged.

Based on the result of the evaluation, a coating quality of the electrode may be continuously determined. In other words, the method comprises determining S3a a coating quality based on the evaluating. The coating quality may be determined based on how the power consumption meets the deviation limits. For example, if the power consumption of an electrical component 5 failing to exceed any deviation limit, then the coating quality of the electrode is satisfying. If the power consumption exceeds a first deviation limit but not a second deviation limit, the coating quality of the electrode is considered sufficient, but a notification is produced to an operator. If the power consumption exceeds the second deviation limit but not a third deviation limit, the coating quality of the electrode is still considered sufficient, but a notification is produced to an operator with a recommended action. If the power consumption exceeds the third deviation limit, the coating quality of the electrode is not considered sufficient, and a notification is produced to an operator with a recommended second action, for example stopping the production. This may be extended such that if the power consumption of each, or a plurality, the electrical components 5 do not exceed any deviation limit, then the coating quality of the electrode is considered satisfying, and so on. Hence, in some embodiments, the evaluating S3 comprises determining S3b an action to be taken upon the measured power consumption failing to meet a predetermined coating quality of the secondary cells. The predetermined coating quality is here defined by one or more deviation limits. The deviation limits may be determined by off-line inspection and/or experiments on secondary cells. The recommended action may be one or more of stopping the coating process and/or calendering process, configuring at least one of the one or more electrical components 5, or testing the produced electrodes of the secondary cells.

Figure 9:
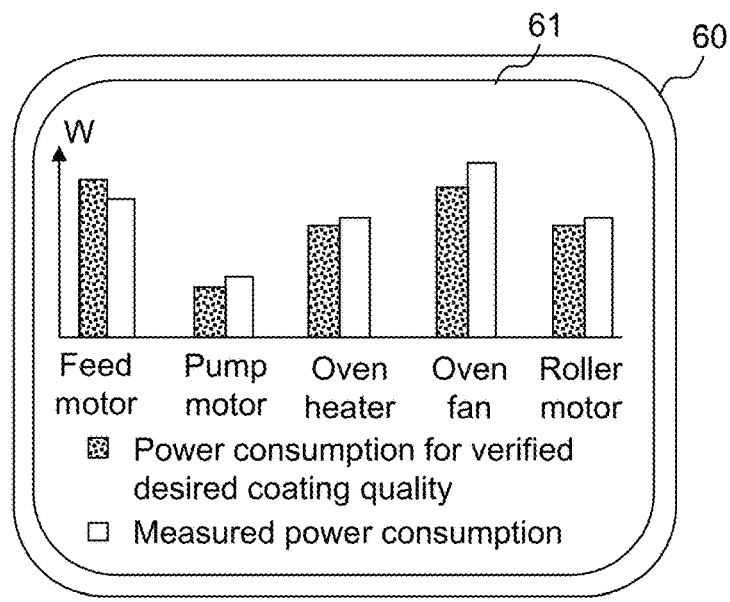
FIGS. 9-10 illustrate exemplary user interface layouts.
Figure 10:
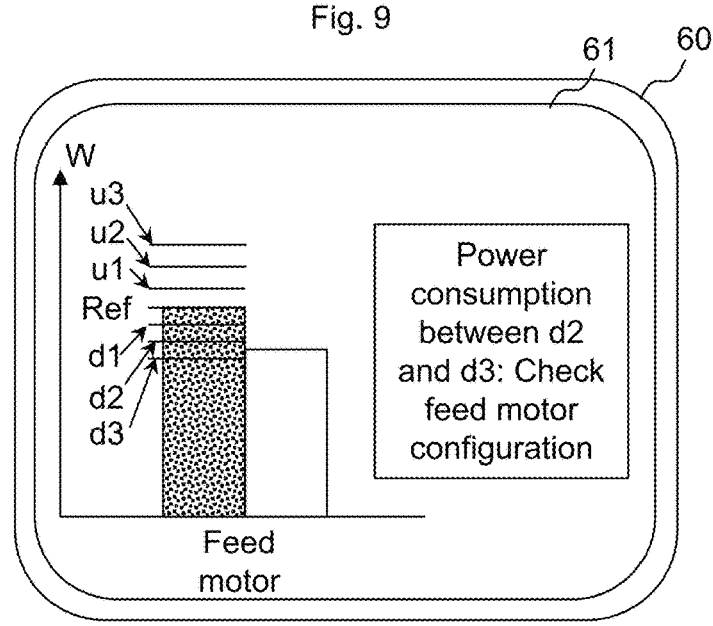
Figure 11:
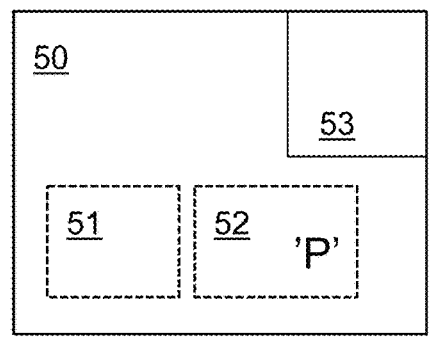
FIG. 11 illustrates a control arrangement configured to perform the proposed method.

One or more results of the evaluation may be presented on a display 61 of a user device 60, as illustrated in FIGS. 9 and 10. The user device 60 may be a mobile phone, a stationary control station, a computer or similar. In FIG. 9 the result of the evaluation is illustrated on a graphical user interface with a diagram with power measurements for a plurality of electrical components 5. FIG. 9 illustrates a first view of the graphical user interface. The illustrated electrical components 5 are: a feed motor (foil feed motor 14), a pump motor (slurry pump motor 17), an oven heater (coating oven heater 25), an oven fan (coating oven fan 26) and a roller motor (roller motor 38), but it should be understood that less or more electrical components 5 could be illustrated. The diagram has two axes, one y-axis with power consumption in Watts and an x-axis with the different electrical components 5. The diagram illustrates the power consumption for each of these components in real time. Each electrical component 5 has a reference power consumption value illustrated as a dotted staple. The reference power consumption value is thus typically constant. The power consumption for the respective electrical component is illustrated as a white staple. An operator can thereby continuously monitor the power consumption for each electrical component 5, and thereby the quality of the coating process in terms of how well the power consumption meets the reference power consumption value and any deviation limits. FIG. 10 illustrates in a second view of the graphical user interface the feed motor power consumption in more detail. A plurality of deviation limits d1, d2, d3 and u1, u2 and u3 are illustrated, together with the power reference value Ref. Here it can be seen that the power consumption of the feed motor is between two deviation limits d2 and d3, and a recommended action of checking the feed motor configuration is indicated on display 61. Hence, in some embodiments, the method comprises indicating S4 a result of the evaluation to an operator, in particular via a display.

In the coating process and the calendering process, there are also electrical components involved that are used for regular inspection. These electrical components are for example: one or more weight measurement units 15a, 15b, 22a, 22b, 29a, 29b, and/or one or more image sensors 23, 30. Monitoring data from these electrical components may be used to enhance the analysis S3. Hence, in some embodiments, the method comprises obtaining S2 monitoring data from one or more of the electrical components, wherein the monitoring data is other than data of power consumption. In such embodiment, the evaluating S3 additionally comprises evaluating the coating quality by analyzing the obtained monitoring data using coating quality criteria, wherein the coating quality criteria defines coating quality of the secondary cells based on obtained monitoring data of the one or more electrical components. Thus, the monitoring data of the uncoated or coated foil 12 can give additional information such that a cause of any crossing of a deviation limit can be determined with a higher accuracy. The monitoring data is for example a weight of the foil 12, a thickness of the foil 12 and/or an image of the foil 12 indicating dimensions of the foil 12 or any defect of the foil 12, uncoated or coated. The dimensions are, for example, the width. Hence, in some embodiments, the monitoring data is indicative of one or more of weight, thickness, width and defects. In one example, if a foil collector motor 36 consumes more power than usual, it is an indication that the load on the foil collector motor 36 is greater than usual, e.g., that the coating layer is too thick and therefore is heavier to push. If the foil collector motor 36 consumes less power than usual, it is an indication that the load is smaller, e.g., that the coating layer is too thin. If the weight measurement unit 29a, 29b simultaneously measures that the coated foil 12 has a desired weight, then the cause of error may be a malfunctioning foil collector motor 36. In the calendaring process, the weight and thickness of the electrode 12 may be measured before and after the calendaring. If the thickness has not changed when the pressing rollers 37 are working harder, hence using more power than a reference value, it may be an indication that the coating has a solid content that differs from a solid content of a reference coating.

The following is a non-exhaustive list of causes of deviation from a power reference value for some of the electrical components used:

Foil feed motor 14: if a foil feed motor 14 consumes more power than a corresponding power reference value, it may be an indication that the load on the foil feed motor is greater than usual, e.g., that the uncoated foil is too thick and therefore is heavier to pus h. If the foil feed motor 14 consumes less power than a corresponding power reference value, it is an indication that the load is smaller, e.g., that the uncoated foil is too thin.

Slurry tank mixer motor 45, 46: if a slurry tank mixer motor 45, 46 consumes more power than a corresponding power reference value, it may be an indication of a higher viscosity of the slurry and/or greater solids content. If a slurry tank mixer motor 45, 46 consumes less power than a corresponding power reference value, it may be an indication of a lower viscosity of the slurry and/or lower solids content.

Slurry pump motor 17: if a slurry pump motor 17 consumes more power than a corresponding power reference value, it may be an indication of a higher viscosity of the slurry and/or greater solids content, and/or that a smaller holed slot die shim is used in the coating head 18, and/or that the filter 81 is clogged. If a slurry pump motor 17 consumes less power than a corresponding power reference value, it may be an indication of a lower viscosity of the slurry and/or lower solids content, and/or that a larger holed slot die shim is used in coating head 18.

Coating oven heater 25: if a coating oven heater 25 consumes more power than a corresponding power reference value, it may be an indication of breakdown of systems in other oven modules so this one must work harder. If a coating oven heater 25 consumes less power than a corresponding power reference value, it may be an indication of a fault in the system.

Coating oven fan 26: if a coating oven fan 26, in other words a fan motor actuating blades of the fan 26, consumes more power than a corresponding power reference value, it may be an indication of a higher humidity, meaning a lower slurry solid content and a correspondingly higher solvent slurry content of the coating. If a coating oven fan 26 consumes less power than a corresponding power reference value, it may be an indication of a lower humidity, meaning a higher slurry solid content and a correspondingly lower solvent slurry content of the coating. However, if the fan power changes due to humidity fluctuations in the oven, then humidity should already be detectable through existing system.

Coating oven compressor 27: if a coating oven compressor 27, in other words a compressor motor providing power to a compressor head of the coating oven compressor 27, consumes more power than a corresponding power reference value, it may be an indication of breakdown of systems in other oven modules so this one must work harder. If a coating oven compressor 27 consumes less power than a corresponding power reference value, it may be an indication of a fault in the system.

Slitting knife motor 33: if a slitting knife motor 33 consumes more power than a corresponding power reference value, it may be an indication that the blade is dull and/or that the electrode is thicker than a reference electrode. If a slitting knife motor 33 consumes less power than a corresponding power reference value, it may be an indication that the blade is sharp, and/or that the electrode is thinner than a reference electrode.

Foil collector motor 36: if a foil collector motor 36 consumes more power than a corresponding reference value, it may be an indication that the load on the foil collector motor 36 is greater than usual, e.g., that the coating layer is too thick and therefore is heavier to push. If the foil collector motor 36 consumes less power than a corresponding reference value, it may be an indication that the load is smaller, e.g., that the coating layer is too thin.

Magnetic bar 21a, 21b: if a magnetic bar 21a, 21b consumes less power than a corresponding reference value, it is an indication that the magnetic bar is down, for example due to malfunction and/or that there is a break in a power feeding wire to the magnetic bar(s).

Roller motor 38: if a roller motor consumes more power than a corresponding power reference value, it may be an indication of a thicker coated electrode and/or a higher solid content of a coating than a reference coating. If a roller motor 38 consumes less power than a corresponding power reference value, it may be an indication of a thinner coated electrode and/or a lower solid content of a coating than a reference coating.

The coating quality criteria may repeatedly or continuously be updated based on a result of the evaluating and/or new inspections of secondary cells where better quality has been found. For example, if the coating continuously is evaluated to have a quality within the most narrow deviation limits, the deviation limit(s) may be made more narrow in an effort to further improve the coating quality. In other words, the method comprises S5 updating the coating criteria based on one or more of the evaluating S3 and data from testing of secondary cells. The developing S0 may also comprise developing a power consumption signature of the coating process comprising individual reference values for power consumption for a plurality of the one or more electrical components at the same time instance. Hence, the developing may include putting together a power consumption signature that reflects power consumption of individual electrical components during the same time instance. Of course, the power consumption signature may be continuously updated based on a result of the evaluating and/or new inspections of secondary cells where better quality has been found.

FIG. 12 illustrates a control arrangement 50 configure to perform the proposed method. The control arrangement 50 is for example located at premises provided or controlled by the cell manufacturer. The control arrangement 50 may partly be located on a cloud-based server. The control arrangement 50 comprises at least one processor 51 and memory 52. In general, the control arrangement 50 is configured to perform all embodiments of the method described herein. This might e.g., be achieved by the processor 51 executing software 'P' stored in the memory 52. More specifically, the control arrangement 50 is configured to obtain power consumption as power consumption data from the power measurement units 40 and optionally monitoring data from the electrical components 5. The control arrangement 50 is also configured to transmit data and/or signals to a user device 60. Control arrangement 50 also comprises a communication interface 53, e.g., one or more I/O interfaces, for receiving and transmitting data and/or signals, and optionally for connection to a user interface. The term "user interface" is intended to include any and all devices that are capable of performing guided human-machine interaction comprising presentation of information and receipt of user input. The I/O interface(s) may be configured for wired or wireless data communication. More in detail, the control arrangement 50 as obtain, during the coating process and/or calendaring process, power consumption of one or more electrical components 5 used for performing the coating process and/or calendering process, and to evaluate the coating quality by analyzing the measured power consumption using coating quality criteria. The coating quality criteria defines coating quality of the secondary cells based on measured power consumption of the one or more electrical components 5.

The present disclosure uses the term "power consumption" to indicate the consumption of electrical energy at a time instance. Such power consumption is measured in Watts, or Joule per unit time. The time instance is typically very short but may also be an interval. The power consumption may thus refer to an energy consumption, hence the energy consumed over the interval, and then measured in Joule or kWh. The interval may for example be a time period during which a roll is produced. Hence, power consumption and energy consumption may generally be used interchangeably. Power consumption data is generally data indicative of the power consumption.

The proposed technique has been described with reference to lithium-ion cells, but it should be appreciated that method for other types of cells including cells made from solid state materials, such as graphene. Such cells are expected to be more commonly used in the future.

The terminology used in the description of the embodiments as illustrated in the accompanying drawings is not intended to be limiting of the described method, control arrangement or computer program. Various changes, substitutions and/or alterations may be made, without departing from disclosure embodiments as defined by the appended claims.

The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims.

The present disclosure is not limited to the above-described preferred embodiments. Various alternatives, modifications and equivalents may be used. Therefore, the above embodiments should not be taken as limiting the scope of the disclosure, which is defined by the appending claims.

The invention claimed is:

1. A method for monitoring coating quality during production of electrodes of secondary cells, wherein the production of electrodes comprises a coating process including coating slurry onto a conductive substrate and drying the coated conductive substrate, and a calendering process, wherein the method comprises:
measuring, via one or more power sensors and during at least one of the coating process or the calendering process, power consumption of two or more electrical components used for performing at least one of the coating process or the calendering process,
continuously, during at least one of the coating process or the calendaring process, evaluating the coating quality by analyzing the measured power consumption aggregated over a concurrent time interval and using coating quality criteria, wherein the coating quality criteria defines predetermined coating quality of the secondary cells based on measured power consumption of the two or more electrical components, the coating quality criteria including an individual reference value for power consumption for each of the two or more electrical components, and one or more individual deviation limits from the respective individual reference value, and
when the predetermined coating quality of the secondary cells is not satisfied by the measured power consumption aggregated over the concurrent time interval, initiating one or more actions including one or more of stopping the coating process and/or calendering process, configuring at least one of the one or more electrical components, or testing the produced electrodes of the secondary cells.

2. The method according to claim 1, wherein the electrical components comprise one or more of: a foil feed motor, a slurry tank mixer motor, a slurry pump motor, a coating oven heater, a coating oven fan, a coating oven compressor, a slitting knife motor, a foil collector motor, a magnetic bar, a roller motor.

3. The method according to claim 1, wherein the individual reference value is based on power consumption for each of the one or more electrical components for verified desired coating quality of the secondary cells.

4. The method according to claim 1, wherein the coating quality criteria defines a power consumption signature of the coating process comprising individual reference values for a plurality of the one or more electrical components at the same time instance.

5. The method according to claim 1, wherein the one or more individual deviation limits is one or more of a power consumption value, a mean value, a variance, and a standard deviation.

6. The method according to claim 1, wherein the evaluating the coating quality comprises
analyzing the measured power consumption by comparing the measured power consumption of the one or more electrical components with the corresponding one or more individual deviation limits from the respective individual reference value for the same electrical component, and
determining a coating quality based on the evaluating.

7. The method according to claim 6, wherein the evaluating comprises:
determining an action to be taken upon the measured power consumption does not meet a predetermined coating quality of the secondary cells.

8. The method according to claim 7, wherein the action is one or more of stopping the coating process and/or calendering process, configuring at least one of the one or more electrical components, or testing the produced electrodes of the secondary cells.

9. The method according to claim 1, comprising indicating a result of the evaluation to an operator, in particular via a display.

10. The method according to claim 1, comprising obtaining monitoring data from one or more of the electrical components, wherein the monitoring data is other than data of power consumption, and wherein the evaluating additionally comprises evaluating the coating quality by analyzing the obtained monitoring data using coating quality criteria, wherein the coating quality criteria defines coating quality of the secondary cells based on obtained monitoring data of the one or more electrical components.

11. The method according to claim 10, wherein the monitoring data is indicative of one or more of weight, thickness, width and defects.

12. The method according to claim 1, comprising developing coating quality criteria that corresponds to coating quality of the secondary cells.

13. The method according to claim 12, wherein the developing coating quality criteria comprises developing a power consumption signature of the coating process comprising individual reference values for power consumption for a plurality of the one or more electrical components at the same time instance.

14. The method according to claim 1, wherein the coating quality criteria includes a reference value for power consumption based on aggregated power consumption of the one or more electrical components, and one or more individual deviation limits from the reference value.

15. The method according to claim 1, wherein the measuring power consumption includes measuring power, current and/or voltage of one or more of the electrical components.

16. The method according to claim 1, wherein the coating quality criteria is time dependent.

* * * * *